July 29, 1958 C. W. STEWART 2,844,963
TEMPERATURE AND PRESSURE COMPENSATING DEVICE FOR GAS METERS
Filed Oct. 7, 1955
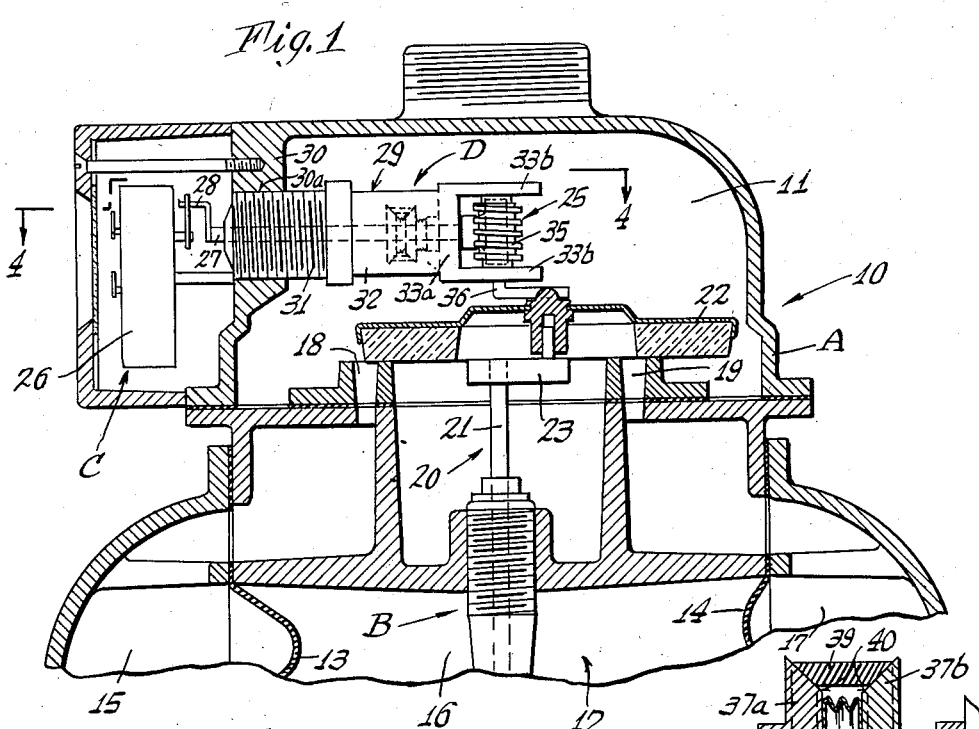
INVENTOR.
Charles W. Stewart
BY
Johnson and Kline
ATTORNEYS

# United States Patent Office 2,844,963
Patented July 29, 1958

2,844,963

TEMPERATURE AND PRESSURE COMPENSATING DEVICE FOR GAS METERS

Charles W. Stewart, Fairfield, Conn., assignor to The Sprague Meter Company, Bridgeport, Conn., a corporation of Connecticut Application October 7, 1955, Serial No. 539,112

2 Claims. (Cl. 73—233)

This invention relates to gas meters and more specifically to the improvement of a new and novel compensating drive means for operatively connecting the metering mechanism in driving relationship with the index registering mechanism to automatically compensate for the varying amounts of gas per unit volume due to temperature and pressure changes.

Heretofore, in meter constructions of the type commonly known and used, the metering mechanism was directly connected to the index registering mechanism so that the latter simply recorded the revolutions of the meter spindle to indicate the number of unit volumes of gas delivered. As a result of this type of direct drive constructions, it was impossible to correct for the varying amounts of the gas contained in each unit volume, which constantly fluctuates according to the varying temperature and pressure, usually acting simultaneously, on the gas.

Since a standard cubic foot of gas is that quantity of gas, which at a temperature of 60° F., and a pressure of 30 inches of mercury occupies one cubic foot, any deviation or change from these standard conditions will change the volume of a measured cubic foot. In applying the law of Charles and Boyle it has been discovered that for every 5° (approximate) increment change in temperature from that of the base temperature, 60° F., the change in volume is 1% and that for every pressure increment variation of 4" W. C. (approximate), the change in volume is likewise 1%.

As the trend today is to outside installations due to the economics of installation, safety and accessibility for servicing and reading the meters, surveys indicate that such installations encounter temperatures ranging from 40° F. below zero to 120° F. above zero. Thus, a meter heretofore utilized operating at 10° F. in winter, would register 1% less for each 5° F. below 60° F., or in other words, the meter would register 10% less gas than the customer would actually receive in standard cubic feet. Conversely, in the summertime a meter operating at 110° F. would register 10% more gas than the customer would receive. As a result, serious losses in cost and revenue were encountered by the consumer and/or utilities respectively depending on the particular geographical location of the meter. Likewise, varying pressures of atmosphere, line, or geographical locations acting simultaneously with the temperature changes resulted in additional volumetric variations which materially affects the amount of gas actually recorded and consumed.

It is an object of this invention to overcome the above disadvantages by automatically varying the driving ratio of the metering mechanism relative to the index mechanism in order to compensate for the variations of pressure and temperature simultaneously affecting the amount of a gas per unit volume so that regardless of any temperature and pressure changes, the amount of gas per unit volume is accurately measured and recorded.

According to this invention, this is accomplished by disposing between the metering mechanism and index registering mechanism a compensating drive means which includes a pair of expansible V-pulleys, one of which is connected to the metering mechanism and the other of which is connected to the index mechanism and a belt means connecting the pulleys in driving relationship. Associated with each of the pulleys there is provided a temperature-pressure responsive means which, when influenced by the temperature and pressure affecting the deviation of the gas volume, proportionately varies the effective circumference of the pulleys so that the ratio between the metering mechanism and the registering mechanism is proportionately increased or decreased accordingly so that the amount of gas per unit volume flowing through the meter is accurately measured and recorded.

A feature of this invention resides in a novel compensating drive means which is relatively simple in construction, positive in operation and inexpensive to manufacture.

Another feature of this invention resides in the provision whereby the drive mechanism can be disposed either within the gas chamber of the meter so that the drive is responsive to the internal temperature and pressure of the meter or it can be utilized equally well outside of the gas chamber of the meter so that the novel drive is responsive to the ambient temperature and pressure affecting the volumetric changes in the gas.

A further feature of this invention resides in that a new and novel compensating drive means can be adapted in existing meters as well as for use in future meters.

Still another feature of this invention resides in the provision that the novel drive mechanism is rendered completely automatic and accurate.

Other features and advantages will be apparent from the specification and claims when considered with the drawings in which:

Figure 1 is a fragmentary sectional side view of the meter illustrating the novel compensating drive means disposed within the gas chamber of the meter.

Fig. 2 is a fragmentary sectional plan view taken along line 2—2 of Fig. 1.

Fig. 3 is an enlarged detail view of the novel compensating drive means of the present invention.

Fig. 4 is a plan view directed to a modified form of the invention wherein the novel compensating drive means is shown situated outside the gas chamber whereby it is responsive to the ambient temperature and pressure affecting the gas.

According to this invention there is shown in Fig. 1 a partial illustration of a gas meter 10 having a casing A typical to that of a Sprague meter and having therein a metering mechanism B, an index registering mechanism C and a novel variable compensating drive means D for connecting the metering mechanism in driving relationship with the index mechanism.

As illustrated, the casing A is partitioned to form the usual distributing gas chamber 11 and metering chamber 12, the latter being divided by diaphragms 13 and 14 to divide the same into three measuring chambers 15, 16 and 17. Passageways 18 and 19 connect the distributing chamber 11 with the metering chamber 12.

The metering mechanism B includes a main movement assembly 20, the shaft 21 of which is operatively connected to the diaphragms 13 and 14 in a well known manner, not shown, so that the fluctuations of the diaphragms impart a rotary movement to the shaft. Rotary movement of the shaft 21 in turn is transmitted to the valve disc 22 through crank arm 23, thereby causing the disc 22 to gyrate to sequentially time the valving of passageways 18 and 19 in the well known manner and the gyration of the disc also imparting a rotary movement to the meter spindle 24 through a gear train 25.

The index mechanism C includes the usual index registering means 26 and an index spindle 27 connected to the registering means through a crank arm 28 so that the rotation of the index spindle is transmitted to the registering means.

Heretofore, the meter spindle was in direct driving relationship with the index spindle in a fixed ratio. As a result, the index spindle simply transmitted the revolutions of the meter spindle to the index registering means. Consequently, no account was taken of the fact that the amount of gas varied per unit volume depending on the temperature and pressure acting upon the gas. As a result, the meter registering means would record or measure more or less gas than that actually consumed or delivered depending on the conditions of temperature and pressure acting on the gas.

In order to overcome this disadvantage, according to the present invention, there is provided a variable compensating drive means to connect the spindle of the metering mechanism into driving relationship with the index spindle so that the ratio between the two varies as the amount of gas per unit volume increases or decreases due to changes in temperature and pressure. In this manner, the amount of gas per unit volume is accurately recorded in base units, regardless of changes of conditions volumetrically affecting the gas.

According to this invention, the compensating drive means D is supported on a bracket 29 mounted to the wall portion 30 of the casing. As illustrated, the bracket 29 includes a boss portion 31 through which the index spindle 27 extends, the boss being threaded in the opening 30a to support it on the wall 30. Suitable packing, not shown, is provided within the boss to prevent leakage about the spindle projecting therethrough. A web 32 connected to the boss and extending longitudinally thereof spaces a channel member 33 from the boss, the back 33a of the channel having journaled therein the other end of the index spindle 27. Laterally spaced therefrom is the meter spindle 24 which has its intermediate portion journaled therein as best seen in Fig. 2.

The end 24a of the metering spindle 24 extending beyond the back portion 33a of the channel has fixed thereto a pinion gear 34 which meshes with a worm gear 35 vertically disposed on a crank arm 36 extending between the flanges 33b of the channel; the pinion 34 and worm gears 35 forming the gear train 25 by which the gyrations of the valve disc 22 are transmitted to the meter spindle 24 causing the latter to rotate.

In order that the metering spindle 24 can be connected in driving relationship with the index spindle 27, a variable compensating drive means D is contemplated. According to this invention, the variable drive means herein illustrated includes a pair of expansible V pulleys 37 and 38, one of which is connected to the metering spindle 24 and the other being connected to the index spindle 27.

As best illustrated in Fig. 3, each pulley consists of two half portions 37a, b and 38a, b respectively; one half portion 37a, 38a of which is fixed on its respective spindle and the other half portion 37b, 38b mounted on its respective spindle so as to be moved relative to its respective fixed half portion. Belt means 39 connect the pulleys in driving relationship. Because the groove 40 of each pulley is substantially V-shaped, it will be noted, that as the half portions of the respective pulleys are moved toward each other, the effective circumference of the pulley is increased, and conversely as the respective half portions are moved apart, tthe effective circumference thereof decreases. Thus it will be noted, that by increasing and decreasing thte effective circumference of the pulleys respectively, a variable driving ratio between the metering and indexing spindles is established.

In order that the effective circumferences of the respective pulleys can be automatically varied to proportionately compensate for the amount of gas per unit volume passing through the meter under any conditions of temperature and pressure, there is associated with each pulley a temperature-pressure responsive means. The temperature-pressure means are arranged to cooperate with the pulleys so that as one of the pulleys is being caused thereby to increase its effective circumference, the effective circumference of the other is being decreased an equal amount. Thus, the sum total of the individual changes of the respective pulleys equals the total change in ratio from meter to index.

As illustrated in Fig. 3, the temperature responsive means of the present invention constitutes a pair of identical Sylphon bellows 41 and 42; the bellows being responsive to both temperature and pressure changes. As shown, one of these Sylphons 41 is disposed between and is connected to the inner side of each half portion of the meter spindle pulley 37. The other Sylphon 42 is connected to and between the outer side 38b of one-half portion of the index pulley and the collar 43 adjacent the back portion 33a of the channel. Thus it will be noted, for example, that as the temperature increases, the meter pulley Sylphon 41 causes the two halves 37a, 37b of the meter pulley to move farther apart thereby reducing the effective circumferences of its respective pulley and, conversely, the Sylphon 42 of the index pulley moves the two halves 38a, 38b of the latter pulley toward each other increasing the effective circumference an equal amount. Inverse cooperative effects occur between the pulleys and Sylphon when the latter is subjected to pressure variations.

Thus, it will be noted, that the temperature and pressure changes acting on the gas affecting volumetric changes also control the driving ratio between the meter and index. As a result, when the temperature increases, the speed of the belt driven by the meter spindle 24 decreases due to the decrease of the effective circumference of the pulley attached to the spindle, while the speed of the index spindle 27 decreases because of the increase of the effective circumference of its pulley. For temperature decreases the converse is true. When the pressure acting on the gas increases, the speed of the belt driven by the meter spindle 24 is increased due to the increase of the effective circumference of its respective pulley, while the speed of the index spindle 27 increases because of the decrease of the effective circumference of its pulley. For pressure decreases, the converse is true.

While any suitable ratio may be established between the actions of the Sylphon to that of the effective changes in circumference of its respective pulleys, it has been found satisfactory to have the Sylphons proportioned so that a temperature increment change of 5° F. would cause the latter to produce a change in the effective circumference of its respective pulley of ½ of 1%. Also, it has been found to be desirable to have the Sylphon bellows proportioned so that an increment change in pressure of 4" W. C. produces a change in effective circumference in its respective pulley of ½ of 1%. Thus, the total change in ratio from meter to index for every increment 5° F. change of temperature and 4" W. C. change in pressure is 1% respectively.

Accordingly, a meter equipped with the novel compensating drive means of the present invention operating at 70° F. temperature and 8" W. C. of pressure would make two compensations to determine the change in ratio from meter to index.

(1) Temperature—1% for each 5° F.×2=2% slower index speed, and (2) Pressure—1% for each 4" W. C.×2=2% faster index speed. Thus, it will be noted that one balances the other and there would be no change in ratio from meter to spindle.

Thus, a meter operating at 50° F. and 8" W. C. would have the following index compensations:

(1) Temperature—1% for each 5° F.×2=2% faster index speed.

(2) Pressure—1% for each 4" W. C.×2=2% faster index speed.

Thus, the total change in index speed equals a 4% faster index speed.

Conversely, a meter according to this invention, operating at 80° F. and 8" W. C. pressure would make the following index compensations:

(1) Temperature—1% for each 5° F.×4=4% slower index speed.

(2) Pressure—1% for each 4" W. C.×2=2% faster index speed.

Thus, the total change in index speed is 2% slower.

From the foregoing it will be noted, that the amount of gas, per unit volume, is greatest under the second stated conditions; consequently, the index speed is proportionately increased to record the increase amount. Conversely, the amount of gas, per unit volume under the third stated conditions is the least per unit volume. Consequently, the index speed is decreased proportionately. Under the first mentioned condition, the change due to temperature is balanced by the change in pressure, and consequently there exists no change in ratio from meter to index.

While the foregoing invention was described as having the compensating drive means D within the gas chamber of the meter casing as illustrated in Figs. 1 and 2, it will be noted that under certain conditions it may be desirable to install the compensating means D' of this invention on the outside of the gas chamber, rendering it responsive to the ambient temperature and pressure. This particular modification is illustrated in Fig. 4.

As is there illustrated, the meter spindle 24' is extended through the boss portion 31' of the bracket 29' to the outside portion of the gas chamber; wherein the index spindle 27' is cantileverly extended from the index registering means 26'. In all other respects the novel compensating drive means D' connecting the meter spindle 24' in driving relationship to the index spindle 27' remain the same as hereindescribed.

Thus, it will be noted from the foregoing description, that the novel compensating drive means of the present invention is relatively simple in construction and positive in operation. Further, that the drive is so arranged and constructed that it mechanically and automatically compensates for variations of both temperature and pressure simultaneously acting on a gas in accordance with the laws of Boyle and Charles. Consequently, the amount of gas, per unit volume is accurately recorded, regardless of any change in conditions affecting the same.

Variations and modifications may be made within the scope of the claims and portions of the improvements may be used without others.

I claim:

1. In a gas meter having a metering mechanism including a meter spindle in combination with an index registering mechanism having an index spindle for recording the amount of a gas flowing through said meter, the improvement of a compensating drive means including a pair of expansible, split pulleys, each of said pulleys consisting of two half portions, one of said pulleys being connected to the meter spindle and the other said pulley being connected to said index spindle, belt means connecting said pulleys to operatively connect said metering mechanism in driving relationship with said registering mechanism; and a Sylphon bellows responsive to temperature and pressure operatively connected with each of said pulleys, one of said bellows being connected to and between the half portions of one of said pulleys and the said other bellows being connected to the outside of one half of said other split pulley, so that said temperature and pressure acting on said gas causes said bellows to proportionately vary the effective circumference of said pulleys whereby the ratio between the metering mechanism and registering mechanism is proportionately increased or decreased accordingly so that the amount of gas flowing to the meter is accurately recorded.

2. In a gas meter having a metering mechanism including a meter spindle in combination with an index registering mechanism having an index spindle for recording the amount of a gas flowing through said meter, a compensating drive means including a pair of expansible, split-V pulleys, each of said pulleys consisting of two half portions, one of said pulleys being connected to the meter spindle and the other said pulley being connected to said index spindle; belt means connecting said pulleys to operatively connect said metering mechanism in driving relationship with said registering mechanism; and a Sylphon bellows responsive to temperature and pressure operatively connected with each of said pulleys, said pulley connected to said meter spindle having connected to and between the half portions thereof one of said bellows, and said other pulley connected to said index spindle having said other bellows connected to the outside of one half portion thereof so that the temperature and pressure acting on the gas causes one of said bellows to increase the effective circumference of one of said pulleys as the effective circumference of said other pulley decreases so that the ratio between the metering mechanism and registering mechanism is proportionately increased or decreased accordingly so that the amount of gas flowing to the meter is accurately recorded in a standard base unit.

References Cited in the file of this patent

UNITED STATES PATENTS

| | | |
|---|---|---|
| 1,035,860 | Conradson | Aug. 20, 1912 |
| 1,355,075 | Easton | Oct. 5, 1920 |
| 1,881,572 | Herz | Oct. 11, 1932 |
| 2,059,547 | Brandl | Nov. 3, 1936 |
| 2,262,678 | Heyer | Nov. 11, 1941 |
| 2,308,655 | Hallinan | Jan. 19, 1943 |
| 2,348,593 | Beitler | May 9, 1944 |
| 2,438,934 | Marsh | Apr. 6, 1948 |